United States Patent
Barychev et al.

(10) Patent No.: US 11,140,809 B2
(45) Date of Patent: Oct. 12, 2021

(54) METHOD AND APPARATUS FOR ESTIMATING A SEED GERMINATION ABILITY

(71) Applicant: DUTCH TERAHERTZ INSPECTION SERVICES B.V., Groningen (NL)

(72) Inventors: Andrei Mikhailovitch Barychev, Groningen (NL); Alena Vladimirovna Belitskaya, The Hague (NL); Andrey Vyacheslavovich Khudchenko, Groningen (NL); Antonius Henricus Maria Catharina Baltissen, Wageningen (NL)

( * ) Notice: Subject to any disclaimer, the term of this patent is extended or adjusted under 35 U.S.C. 154(b) by 397 days.

(21) Appl. No.: 14/910,469

(22) PCT Filed: Aug. 5, 2013

(86) PCT No.: PCT/NL2013/050579
§ 371 (c)(1),
(2) Date: Feb. 5, 2016

(87) PCT Pub. No.: WO2015/020515
PCT Pub. Date: Feb. 12, 2015

(65) Prior Publication Data
US 2016/0174456 A1 Jun. 23, 2016

(51) Int. Cl.
*A01C 1/02* (2006.01)
*G01N 21/3581* (2014.01)

(52) U.S. Cl.
CPC .............. *A01C 1/025* (2013.01); *A01C 1/02* (2013.01); *G01N 21/3581* (2013.01)

(58) Field of Classification Search
CPC .................................. A01C 1/02; A01C 1/025
USPC ........................................................... 47/14
See application file for complete search history.

(56) References Cited

U.S. PATENT DOCUMENTS

| 4,602,716 A | * | 7/1986 | Baria-Szabo | A01C 1/025 209/590 |
| 9,857,297 B2 | * | 1/2018 | Hilscher | B07C 5/3425 |
| 2004/0130725 A1 | | 7/2004 | Kido et al. | |
| 2013/0126399 A1 | * | 5/2013 | Wolff | B07C 5/3425 209/555 |

FOREIGN PATENT DOCUMENTS

| CN | 101971726 | * | 2/2011 | ............ A01C 1/02 |
| JP | 2009042207 A | | 2/2009 | |

(Continued)

OTHER PUBLICATIONS

Sun et al., "Identifying Type of Maize with Terahertz Time-domain Spectroscopy", IEEE, 2010, pp. 918-921.

(Continued)

*Primary Examiner* — David J Parsley

(57) ABSTRACT

An apparatus and method for estimating a germination ability of a seed includes a terahertz signal source for emitting a terahertz signal towards the seed, a detector for detecting at least part of the terahertz signal having interacted with the seed, a scanner for moving the support relative to the terahertz signal to provide a scan of the seed, a data processing device for forming an image data from the detected terahertz signal as obtained for a plurality of positions during the scan of the seed, and a decision support system for providing an estimate of the germination ability from the image data. In an embodiment, the terahertz signal source is arranged for emitting a continuous or pulse wave signal, and the detector is arranged for detecting an amplitude and a phase of the terahertz signal having interacted with the seed. A signal representing an outcome of the estimation may control a separator to separate seeds according to their estimated germination ability.

11 Claims, 2 Drawing Sheets

(56) References Cited

FOREIGN PATENT DOCUMENTS

| WO | 830272 | 9/1983 | | |
|---|---|---|---|---|
| WO | 2009027675 A2 | 3/2009 | | |
| WO | 2012048897 A1 | 4/2012 | | |
| WO | WO 2012/048897 | * | 4/2012 | ............... A01C 1/02 |

OTHER PUBLICATIONS

Fedorov et al., "Influlence of THz radiation on early phase of seed germinating and yield of wheat", ICONO, 2010, 8 pages.
Beard et al., "Progress toward two-dimensional biomedical imaging with THz spectroscopy", Institute of Physics Publishing, vol. 47, 2002, 6 pages.
TeraView, "What is Terahertz?", http://www.teraview.com/about/what-is-terahertz-thz.html, Jun. 3, 2013, 1 page.
Tripodi et al., "Broadband terahertz and sub-terahertz CMOS modules for imaging and spectroscopy applications", Procedia Engineering, vol. 47, 2012, 7 pages.
Sun et al., "A promising diagnostic method: Terahertz pulsed imaging and spectroscopy", World Journal of Radiology, vol. 28, Mar. 28, 2011, 11 pages.
Maestrini et al., "Schottky diode based terahertz frequency multipliers and mixers", Comptes Rendus de l'Academie des Sciences-Physique, vol. 11, Oct. 2010, 19 pages.
Notice of opposition to a European Patent, EP30300070, signature of opponent or representative dated Mar. 20, 2018, 5 pages.
European Communication, dated Feb. 11, 2019, 9 pages.

\* cited by examiner

METHOD AND APPARATUS FOR ESTIMATING A SEED GERMINATION ABILITY

FIELD OF THE INVENTION

The invention relates to an apparatus and a method for estimating a germination ability of a seed. Furthermore, the invention relates to a use of a terahertz system and to a seed selection system.

BACKGROUND

Estimation of the germination ability (also referred to as germination capacity or germination power) of seeds may be performed for a variety of reasons. Firstly, it may be applied to distinguish vital seeds that exhibit a high germinability. Furthermore, the estimation of germination ability may be applied to determine if a seed is affected by insects, mold, is empty or is rotten. Also, the estimation of germination ability may be used for selection of seeds.

Estimating the germination ability of a seed, such as a plant seed, has been performed in various ways. These ways include destructive methods, whereby the seed is for example cut. Another example of such known test is the tetrazolium test. Furthermore, some non-destructive methods are known. An example is making use of X-ray. Thereby, the plant seed is subjected to X-ray radiation, an X-ray image is taken, and a germination ability is estimated from the X-ray image.

A problem using X-ray radiation is that, although X-ray is generally claimed to be not harmful, such radiation may carry a risk of causing damage to the genetic cell material of the plant seed, which may cause genetic properties of the plant seed to deteriorate. Also, safety precautions may be needed in order to avoid that an operator is subjected to doses of X-ray radiation. Such safety precautions, e.g. shielding, may require a repetitive opening and closing thereof to feed in resp. discharge the plant seeds, causing a process of testing of larger numbers of seeds to be slow and causing corresponding apparatus to be bulky, complex, requiring specially trained personnel and periodic security checks. Furthermore, before exposing to X-ray, priming of the seed is required. Still further, as X-ray equipment and associated safety provisions are expensive, associated costs are high.

SUMMARY OF THE INVENTION

The invention intends to provide an alternative for estimation of germination ability. In order to achieve this goal, according to an aspect of the invention there is provided an apparatus for estimating a germination ability of a seed, comprising:
a terahertz signal source for generating a terahertz signal,
a support for holding the seed,
a detector for detecting at least part of the terahertz signal having interacted with the seed, the detector comprising a detector output and being arranged for generating a detector output signal at the detector output based on the detected at least part of the terahertz signal,
a data processing device for forming an image data from the detector output signal, and
a decision support system for providing an estimation of the germination ability from the image data.

The inventors have come to the insight of applying a terahertz (THz) signal for estimating the germination ability of plant seeds as they realized that THz signal, in contrast to X-ray radiation, allows to gather an image of amplitude information and phase information, whereas X-ray radiation inspection only provides an image of amplitude information. As dielectric (phase) contrast mechanisms indicating dielectric properties of the material under investigation are strong at THz frequencies, hidden patterns in the seed may be revealed more reliably. Generally, THz radiation is transparent to non-conductive and non-polar materials, while being sensitive to water, potassium, phosphates, sugars, amino-acids, etc. Such substances are comprised in a seed and appear to play a substantial role in the biological processes providing for the germination of the seed and seed vigor. Measurement of intensity of absorption, transmission and reflection of THz radiation (amplitude) and/or measurement of THz signal delay (phase) provides information about a condition of the seed, as substances that play a role in the germination of the seed (e.g. water, amino acids, sugars, etc.) interact with the terahertz radiation, which may tend to enable to obtain information substantially exactly about the aspects of the seed that may be relevant for estimating germination ability, while substances in the seed that are less relevant for estimation of the germination ability, may tend to interact with the terahertz radiation in a different way.

In this document, the term terahertz (also abbreviated as THz) is to be understood as a frequency range of 10 GHz-10,000 GHz, i.e. 0.01 THz to 10 THz.

The terahertz signal source may comprise a single signal generator or an assembly of generator(s), mixer(s), etc. that together result in the generation of a terahertz signal that is emitted to form a terahertz signal interacting with the seed.

The terahertz signal may be any signal type, such as a transmitted signal or an electromagnetic field, e.g. a near field or a far field type.

The detector may comprise a detector-unit (comprising e.g. a lens and a terahertz receiver, an antenna and a terahertz receiver or the like) and a detection circuit, e.g. comprising one or more mixers, filters, amplifiers, etc. in order to derive the detection signal. The signal source and detector may in some embodiments in part be integrated: for example, when deriving phase information from the detected terahertz radiation, the detection circuit of the detector may make use of a reference signal obtained from the terahertz signal generator.

The signal source and detector may make use of components operating at room temperature. Also, use may be made of cooled components or circuit parts, e.g. using cryogenic cooling.

In order to obtain an image (i.e. a data set that e.g. represents an at least 2 dimensional representation of the measurement data obtained by the detector), several approaches are possible, as will be briefly described below.

Firstly, use may be made of a plurality of terahertz signals. Thereby, use may be made of a plurality of signal sources, a plurality of detectors or both. As a result, a plurality of detections may be performed, e.g. one per detector, so as to obtain a corresponding plurality of data points, each representing a measurement at a particular spot of the seed. The signals (and correspondingly, the spots of the seed that are measured) may be arranged in a form of a line (a one dimensional matrix) or in a form of a two dimensional matrix. In the case of a one dimensional matrix, a scanning movement of the seed may be used to complement the one dimensional matrix of detection towards a two dimensional one (the scanning e.g. in a direction perpendicular to the line along which the spots on the seed are located where the signals interact with the seed). The plurality of emitted terahertz signals may be generated each by their own circuit, however it is also possible that use is made of one or more splitters to spit a single signal from a single signal source into plural ones. Secondly, use may be made of a scanner. Thereby, the apparatus may comprise a scanner for moving the support relative to the terahertz signal to provide a scan of the seed, the data processing device being arranged forming an image data from the detector output signal as obtained for a plurality of positions during the scan of the seed. In order to obtain an image, the scanner is arranged to perform a scanning movement whereby the terahertz signal (e.g. a beam) is moved in respect of the seed or vice versa. The scanner may thereto move the support, the emitted terahertz signal beam or both. The emitted terahertz signal beam may be moved by any suitable means, such as moving a coupling part of the signal source and/or detector, etc. The movement may be formed by a movement in at least 2 dimensions, for example scanning a plane substantially perpendicular to propagation direction of the THz radiation towards the seed. Depth information may be added by further including a scanning in a direction parallel to the propagation direction of the THz radiation. The scanning movement may in addition to the above described movements or instead thereof also comprise a rotation, e.g. along 2 or 3 rotational axes so as to obtain at least partly circumferential image data of the seed to be tested, allowing to test forms, which may e.g. be used when testing bulbs, such as flower bulbs.

During performing the scan, the detector successively detects at least part of the terahertz radiation having interacted with the seed, for the different scanning positions and/or scanning angles. During the scanning, the source may generate the terahertz radiation continuously which may provide a fast processing, as the measurement may be performed during the scanning movement. Alternatively, the scanner may successively provide stationary scanning positions in a sequence, which may provide for more accurate measurements (hence a higher image quality and estimation), possibly at a somewhat longer processing time.

As already indicated above, a combination of scanning and a plurality of emitted terahertz-signals may be provided, e.g. in the example of a one dimensional matrix of signals, combined with a scanning in perpendicular direction. Another example is a two dimensional matrix of signals, supplemented by a scanning in order to increase a resolution, i.e. increase a number of data points of the image data by scanning in a spatial range between the dots of the two dimensional matrix. A still further example is the combination of a single signal source and single detector with a one dimensional scanner which provides a scanning movement along a single direction. The single detector in combination with the one dimensional scanner movement provides for a line type image, comprising a continuous signal or a plural of pixels representing a line type image. In particular in case the scanner is formed by a conveyor that feeds the seed into or through the apparatus, a fast (no further scanning), reliable (giving a line image that allows a better estimation then would have been possible with a single measurement only) and low cost estimation.

The data processing device forms an image from the detector output signal. A variety of techniques may be used.

In an embodiment, the image data forms a single pixel (i.e. the image data being formed by a single value), the data processing device thereby forming a single pixel image data, for example using amplitude of the detection signal, phase of the detection signal or a combination thereof. Thereby, a fast determination may be provided, which may be sufficient to for example recognize an empty seed. Such a single pixel determination may also be used as a pre-scan, i.e. in case the single pixel determination provides that the seed is empty or otherwise strongly affected, the process is stopped, while otherwise, a more detailed image capturing is started to perform a more accurate estimation. Such a two step approach may make the estimation faster, as obviously defect seeds may be recognized relatively fast.

In another embodiment, multiple pixels (i.e. a detector signal at multiple spots of the seed) are captured by the data processing device. Thereto, use may be made of scanning as described above, multiple emitted terahertz signals as described above or both.

The image data may hence comprise a single value, a 1 dimensional pattern, a 2 dimensional pattern, a 3 dimensional pattern, the patterns e.g. comprising a reflection pattern, an absorption pattern, a received signal time pattern, etc.

In an embodiment, the data processing device is arranged to derive an image from the combined detector output and the position and/or angle information (as may e.g. be provided by the scanner or derived from a multi signal beam dimensioning) so as to build the image from a combination of position and detector data.

The data processing device and decision support system may be implemented as software to be executed in a computing device, such as a computer, microcontroller, distributed computer network, or any other data processing arrangement. The data processing device and decision support system may be separate entities (e.g. separate software programs, or even separate computing devices each being assigned a task of data processing or decision support), however it is also possible that the data processing device and decision support system are integrated, e.g. implemented as software processes running in a single software program. The decision support system may be provided locally, e.g. implemented by a computer which is on site where the measurements are performed, however it is also possible that the decision support (or part thereof) is located remotely, for example making use of a remote database of decision rules, references, reference images, etc.

The decision support system may generally be implemented as comprising a set of rules and references, and being arranged to provide a possible outcome based on such set of rules and references. The references may for example comprise reference images, reference thresholds for certain parameters (such as size of the seed, size of area's defined in the image in the seed which exhibit comply to a predefined criterion, etc. The rules may hold that a seed having a measured property exceeding a value of the corresponding threshold should be classified into at least one of accepted (i.e. estimated to fulfill a germination requirement level) and non-accepted (i.e. estimated to not fulfill the germination requirement level), etc. The rules may further provide comparison rules, e.g. to assign a germination estimate to the seed based on the comparison of the image data of the seed with the reference image data. The rule may for example assign to the seed a same germination ability estimate as the germination ability estimate of the reference image data appears (from the comparison) to be most closest, i.e. most similar. As another example an average or weighted average may be taken of the germination ability estimate of a subset of the reference image data of seeds that appear to be highly similar, etc.

The article Influence of THz radiation on early phase of seed germinating and yield of wheat, Fedorov, V. I. et. al., SPIE Proceedings, Vol. 7993, ICONO 2010, Jan. 1, 2010, discloses the use of THz radiation for promoting a germination ability of seeds. The article describes that an application of THz radiation for a time period of 1, 2 or 3 hours appears to have an effect on specific cell activity, which appeared to result in an increase in germination ability. Given the long time period of one or more hours, using THz radiation for a relatively fast screening process seems non-obvious.

The term germination ability is to be understood as an ability of the seed to germinate, i.e. to develop into a plant. The term seed is to be understood so as to comprise any seed. In an embodiment, the seed is a plant seed. The term plant seed is to be understood so as to include a tuber, a bulb, a tree seed, etc. Non limiting examples of a plant seed may include maize seed, tomato seed, pepper seed, seed-onion, carrot seed, cucumber seed, seed-potato, flower bulbs, tree seeds such as *fagus sylvatice, abies alba*, etc.

The germination ability estimate (and a corresponding signal) may be formed by a discrete value, e.g. a digital value, e.g. "high" or "low", or a class: "high", "rotten", "affected by insects", "empty", "mechanically damaged", "low"", etc. A selector, as described below, by perform a selection accordingly. In an other embodiment, the germination ability estimate provides for a value in a range, such as a numeric value, having a range from low to high germination ability estimate. The terahertz signal source may directly generate a signal in the terahertz frequency band. Alternatively, up conversion techniques, mixing, or other techniques may be used to convert an initial signal at a lower frequency band into a terahertz signal. Similarly, the detector may immediately detect a terahertz band signal. Furthermore, down conversion techniques, mixing, or other techniques may be used to convert down to a lower frequency band before detection or as a part of the detection. For example, up conversion from and down conversion to the microwave frequency band may be applied, allowing to may use of microwave equipment, for example for measuring amplitude and phase, e.g. using a microwave vector network analyzer. A coupler may be provided that couples the signal as generated by the signal generator, to the seed. In addition, the THz signal frequency can be continuous, or swept or the THz signal can be pulsed as, for instance in time domain reflectometer (TDR) or general time domain THz technique, or can be obtained as a difference of two photonic high frequency signals or can be generated as harmonic of low frequency signal.

The support may comprise any suitable support to hold the seed, e.g. a vacuum clamp, an electrostatic clamp, a table, a conveyor belt, etc.

In an embodiment, the terahertz signal source is arranged to emitting the terahertz signal in a range of 0.01 to 10 THz (i.e. 10 GHz to 10000 GHz). The signal source may be arranged to emit, during testing a seed, a single frequency to the seed. In an alternative embodiment, the signal source may be arranged to emit a plurality of frequencies during testing the seed, e.g. simultaneously or as a time series, e.g. as a frequency sweep, allowing to obtain depth information, enabling to derive by the data processing device an image comprising depth information using a simplified (e.g. two dimensional) imaging, e.g. using scanning (i.e. scanning to perform imaging at different depths may be at least partially omitted). A plurality of frequencies (e.g. applying a frequency sweep or applying frequency steps, may also be applied to improve a signal to noise ratio of the image data, as artifacts occurring at a particular one of the frequencies, while being absent at other frequencies (or having another effect at other frequencies_may have a reduced impact on the image data. Thereto, for example, the data processing device may add or average the image data obtained at the different frequencies, into a single image data, so as to reduce an effect thereof. The frequency sweep may also be used to provide a spectroscopic information.

In an embodiment, the terahertz signal source is arranged for (e.g. continuously or repetitively) emitting a continuous wave signal, and/or a pulse signal. In an embodiment, the detector is arranged for detecting an amplitude of the terahertz signal having interacted with the seed, the detector output signal being representative of a detected amplitude of the terahertz signal. Detecting amplitude, in an embodiment without detecting phase, allows a relatively low cost setup, as a less complex setup may be chosen whereby the comparison of the received signal to a signal derived from the transmitted signal (for reference purpose) in order to derive phase information may be omitted. Amplitude detection may performed with the terahertz signal source (e.g. continuously or repetitively) emitting a continuous wave signal, and/or a pulse signal.

In an embodiment, the terahertz signal source is arranged for (e.g. continuously or repetitively) emitting a continuous wave signal, and/or a pulse signal. In an embodiment, the detector is arranged for detecting an amplitude and a phase of the terahertz signal having interacted with the seed, the detector output signal being representative of a detected amplitude and phase of the terahertz signal. By detecting amplitude and phase of the signal having interacted with the seed, absorption/reflection on the one hand as well as e.g. dielectric properties derived from phase information on the other hand may be taken into account. A high contrast image data may be obtained, the image data comprising a high information content of data relevant to the estimation of germination ability, allowing to perform a reliable estimation. In order to detect amplitude and phase of the signal having interacted with the seed, use may be made of a Vector Network Analyzer that enables to detect amplitude and phase by comparison with a reference signal obtained from the signal source. Amplitude and phase detection may performed with the terahertz signal source (e.g. continuously or repetitively) emitting a continuous wave signal, and/or a pulse signal. In another embodiment, the detector is arranged for detecting a phase of the terahertz signal having interacted with the seed, the detector output signal being representative of a detected phase of the terahertz signal. Detection of only phase may allow to image dielectric properties of the seed.

In an embodiment, the data processing device is arranged for combining amplitude and phase data as comprised in the detector output signal, and for forming an image data of the seed from the combined amplitude and phase data (as obtained during the scanning). The amplitude and phase data may e.g. be added allowing to obtain a combined image data of amplitude and phase information, thus including absorption/reflection on the one hand as well as e.g. dielectric properties derived from phase information on the other hand. A high contrast image data may be obtained, the image data comprising a high information content of data relevant to the estimation of germination ability, allowing to perform a reliable estimation. Further examples of an image data provided by the data processing device may be an image data of an amplitude signal as obtained from the detector (expressing reflection, absorption, transmission or a combination thereof), an image data of a phase signal as obtained from the detector (expressing e.g. dielectric properties of the materials in the seed), a set of both amplitude and phase image data. The image data may be a 1 dimensional image data, a 2 dimensional image data or a 3 dimensional image data (also containing depth information). Depth information may be obtained from a suitable 3 dimensional scanning, phase information or by making use of plural frequencies (e.g. a frequency sweep or stepwise frequency changes) so as to obtain depth information.

The interaction of the signal with the seed may be transmission through the seed, reflection by the seed or a combination thereof. In an embodiment, the signal generator source and the detector are arranged for free space coupling, also referred to as quasi optical coupling. The coupler transmits by free space coupling the generated terahertz signal to the seed, and the detector detects by free space coupling the signal that interacted with the seed. Using free space coupling, no physical contact needs to be made by signal source and/or detector, allowing to perform the scan relatively fast and reducing a risk of invoking any mechanical damage to the seed during the process. Likewise, in another embodiment, the signal generator source and the detector may be arranged for near field coupling with the seed.

Instead of or in addition to a continuous wave signal, use may be made of a pulsed signal. Accordingly, in an embodiment, the terahertz signal source is arrange for emitting a terahertz pulse signal. The pulse signal may comprise a single pulse or a plurality of pulses, e.g. a time sequence of pulses. Accordingly, the terahertz signal may comprise single pulse or a plurality of pulses. In the context of pulses, the term terahertz is to be understood as pulses that provide a frequency content (i.e. their frequency domain energy content being in or reaching into the terahertz frequency band). In the case of pulses, the detector may be arranged to detect a time response, such as a time domain reflection. Accordingly, in data processing device may comprise a time domain reflectometer.

In an embodiment, the decision support system is arranged for comparing the obtained image data of the seed with at least one reference image data stored by the decision support system, and deriving an estimation of the germination ability of the seed from the comparison. The reference image data may comprise one or more of image data of healthy seeds, empty seeds, rotten seeds, seeds damaged by insects, etc., (the reference image data being e.g. obtained from scanning reference examples of seeds). Thereby, the apparatus may easily be learned for different seed types and different conditions, by measurement of sample(s) in various conditions, storing the obtained image data of the reference sample(s) for comparison. The reference image data may alternatively be pre-stored or remotely accessible, for example from a remote server connected to the decision support system via the internet.

In the case of the terahertz signal source generating a pulse, the reference image pattern(s) may be reference time domain reflection pattern(s). Different reference time domain reflection pattern(s) may be provided representing various conditions of the seed (for example empty, rotten, ok, etc.). In the case of a single pixel image, the reference image data may comprise a reference value. Different reference values may represent various conditions such as rotten, empty, etc.

The decision support system may be learned, an example being provided as follows: First, a set of seeds are tested in order to estimate their germination ability, this may be done using another technique, such as X-ray. Each seed of the set is then assigned a germination estimate (based on the analysis by the other technique). The seeds are subjected to the terahertz testing as described in order to obtain image data for each seed of the set. The obtained image data for each seed is coupled to the germination estimate as obtained by the other technique. The image data in combination with the estimate is then stored as reference image data. Another example of learning the decision support system may be to using the terahertz apparatus and/or method as described in this document for generation of image data for each seed of the set. Based on the image data, the estimation is however performed by an operator, such as a trained operator. The obtained image data for each seed is coupled to the germination estimate as provided by the operator. The image data in combination with the estimate is then stored as reference image data.

Another embodiment for learning patterns from THz images, comprises using supervised machine leaning approach, where feature vectors based on fft (fast fourier transform) or wavelet coefficients are constructed and trained using a machine learning algorithm, e.g. such as SVM (support vector machine). Pattern recognition techniques may be used to automatically or semi-automatically inspect THz images. The pattern recognition techniques comprises several steps. First, a "corpus", i.e. collection of labeled examples (feature vectors) derived from THz images, is constructed. Second, the corpus is randomly split into train and test sets (using e.g. a 90/10 split) where the train set will be used to train the classifier and the test set will be used to evaluate the classifier performance. Mathematically spoken, during the training phase a classifier learns a separation hyperplane in feature space. As a measure of classifier performance a (classical) micro-averaged Recall, Precision and F1-value are estimated. Within these training, testing and evaluating phases the classifier is actually built. Finally, the obtained classifier is used to predict the labels (classes) for unseen examples. As a classification algorithm we use the Support Vector Machine (SVM). SVM is a popular classification algorithm that has been used successfully in various applications. SVM was designed to find a unique, optimal separation hyperplane. A hyperplane is considered optimal when it separates the positive and the negative training examples in such a way that it has the largest possible margin to the nearest training examples as presented. SVM basically solves a special convex Quadratic Programming problem, which is quite computationally demanding, however, an accurate estimation may be achieved.

According to a further aspect of the invention, there is provided a method for estimating a germination ability of a seed, comprising:
generating a terahertz signal,
holding the seed by a support,
detecting at least part of the terahertz signal having interacted with the seed and generating a detector output signal based on the detected at least part of the terahertz signal,
forming an image data from the detector output signal, and
providing an estimate of the germination ability from the image data.

According to a still further aspect of the invention, there is provided a terahertz system for estimating a germination ability of a seed, the terahertz system comprising:
a terahertz signal source for generating a terahertz signal,
a support for holding the seed,
a detector for detecting at least part of the terahertz signal having interacted with the seed, the detector comprising a detector output and being arranged for generating a detector output signal at the detector output based on the detected at least part of the terahertz signal, a data processing device for forming an image data from the detector output signal.

According to yet another embodiment of the invention, there is provided a selection system for selecting a seed, comprising:

an apparatus according to the invention, the apparatus further comprising a seed germination ability estimation output and being arranged for providing a seed germination ability output signal at the seed germination ability estimation output, the seed germination ability output signal being representative of an estimation of the germination ability of the seed, a feeder, upstream of the apparatus, for feeding the seed into the apparatus, a separator, downstream of the apparatus, the separator having a control input being connected to the seed germination ability output of the system, the separator being arranged for directing the seed to a first output of the separator in response to the seed germination ability output signal having a first value and to a second output of the separator in response to the seed germination ability output signal having a second value. Thus, automatic or semi-automatic selection of the seeds in accordance with their germination ability estimate may be performed: a threshold may be applied (e.g. expressing a minimum requirement for germination ability) and seeds having an germination estimate exceeding the threshold may be directed to the first output while seeds having a germination estimate below the threshold may be direct to the second output. The selector may for example be pneumatic (directing the seed by an air stream), electrostatic, mechanical or by any other suitable means. The feeder may comprise any transport mechanism such as a conveyor belt, a downwardly sloping chute, a pneumatic seed propelling means, etc. The feeder may further comprise a sequencing device that sequentially releases the seeds one after the other, each to be fed to the apparatus for germination estimation.

With the method, use and selection system according to aspects of the invention, the same advantages and effects may be achieve as with the estimation system according to an aspect of the invention. Also, the same or similar embodiments may be provided as with the estimation system according to an aspect of the invention, achieving the same or similar effects as similar embodiments of the estimation system according to the invention.

BRIEF DESCRIPTION OF THE DRAWINGS

Further advantages, features and effects of the invention will follow from the enclosed drawing, showing a non-limiting embodiment of the invention, wherein.

It is noted that throughout the figures the same or similar reference numerals are applied to indicate the same of similar elements.

DETAILED DESCRIPTION

Figure 1:
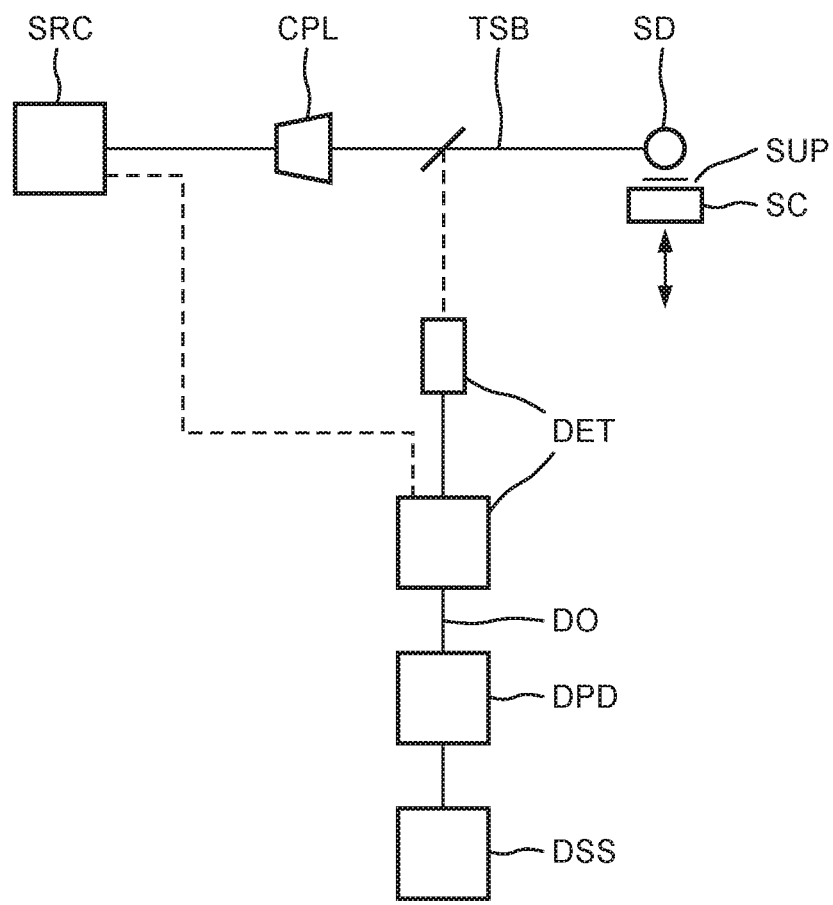
FIG. 1 depicts a general block schematic view of a system in accordance with en embodiment of the invention.

FIG. 1 depicts a block schematic view of a system in accordance with an embodiment of the invention. The system comprises a terahertz signal source SRC that generates a terahertz signal, such as a continuous wave signal. Alternatively, the source generates a pulsed signal. An output of the source carrying the terahertz signal is connected to a coupler (coupling device) CPL that couples the terahertz signal to the seed SD. The coupling device may comprise a combination of a horn and a lens, such as a HDP (high density polyethylene) lens in order to direct the terahertz radiation as generated by the source towards the seed. The seed is held by a support SUP, examples of which may include a table, a vacuum clamp, an electrostatic clamp, etc. A detector DET of the system detects at least part of the terahertz signal having interacted with the seed. Although, in the schematic drawing in accordance with FIG. 1, the source and detector are schematically depicted at different sides of the seed, the detector may in reality for example be positioned so as to receive a part of the terahertz radiation that has been reflected by the seed or a part of the terahertz radiation as transmitted by the seed or a combination thereof. The detector in this example comprises a terahertz detection device, such as a sub-harmonically pumped superlattice electronic device (SLED) and a detection circuit that generates a detector output signal from the output signal of the terahertz detection device (the detection device and the detection circuit having been symbolically indicated in FIG. 1 as separate entities together forming the detector). The terahertz detection device may directly perform a down conversion so as to convert the detected terahertz signal into a signal at a lower frequency band. The detection circuit may generate a single detector output signal DO or a plurality of detector output signals, e.g. one representing amplitude and one representing phase. In order for the detector to operate in synchronism with the terahertz signal source, a synchronization signal may be provided by the source to the detector (or vice versa), as indicated in FIG. 1 by the dotted line, e.g. allowing to perform a phase measurement by the detector. The detector output signal, which may represent amplitude, phase or both, is provided to a data processing device DPD which generates an image data of the seed. Thereto, the seed is scanned by a scanner SC which may move the terahertz signal in respect of the seed or vice versa, image data is formed whereby by the data processing device combines the detector output signal as obtained for the different positions achieved during the scanning. The image data may form a two dimensional image data, using a 2 dimensional scan. Also, 3 dimensional images may be provided, either by providing a 3D scan, collecting phase information or by providing the signal source to emit a plurality of frequencies, whereby the data processing device is arranged for deriving the 3 dimensional image data from the 3D scan, the detector response at the different frequencies or both. The data processing device may further apply suitable processing techniques, such as filtering for noise reduction, averaging measurements obtained at different frequencies for improving signal to noise ratio, etc. The image data is provided to a decision support system DSS, in order to estimate a germination ability. The decision support system performs a determination by comparing the image data of the seed to reference image data. The reference image data may for example comprise image data of examples of seeds that exhibit a particular condition, e.g. being OK, being rotten, having low germination ability, etc., and reference a germination estimate has been stored for each of the reference image data. The decision support system compares the obtained image data with the reference image data (e.g. compares with each reference image data) and establishes which one of the reference image data has most in common with the image data (for example by applying a pattern recognition algorithm or by any other suitable comparison). The seed may then be assigned a germination estimate based on the comparison. The assigning the germination estimate may either be performed by assigning the germination estimate of the reference image data that is most similar, or by assigning an average or weighted average of two or more the reference image data, i.e. reference image data from two or more seeds, to provide a higher accuracy. The decision support system and data processing device may be implemented in a form of software, which is for example executed by a computer, a plurality of computers interconnected by a data communication network, or any other data processing arrangement. It is noted that the estimation may, according to an embodiment of the invention, be performed by a human operator. The human operator may perform the estimation directly from the image, i.e. without a decision support system, or may be assisted by an estimate provided by the decision support system.

The reference image data being e.g. obtained from scanning reference examples of seeds. Thereby, the apparatus may easily be learned for different seed types and different conditions, by measurement of sample(s) in various conditions, storing the obtained image data of the reference sample(s) for comparison. The reference image data may alternatively be pre-stored or remotely accessible, for example from a remote server connected to the decision support system via the internet.

In the case of the terahertz signal source generating a pulse, the reference image pattern(s) may be reference time domain reflection pattern(s). Different reference time domain reflection pattern(s) may be provided representing various conditions of the seed (for example empty, rotten, ok, etc.). In the case of a single pixel image, the reference image data may comprise a reference value. Different reference values may represent various conditions such as rotten, empty, etc.

The decision support system may be learned, an example being provided as follows: First, a set of seeds are tested in order to estimate their germination ability, this may be done using another technique, such as X-ray. Each seed of the set is then assigned a germination estimate (based on the analysis by the other technique). The seeds are subjected to the terahertz testing as described in order to obtain image data for each seed of the set. The obtained image data for each seed is coupled to the germination estimate as obtained by the other technique. The image data in combination with the estimate is then stored as reference image data. Another example of learning the decision support system may be to using the terahertz apparatus and/or method as described in this document for generation of image data for each seed of the set. Based on the image data, the estimation is however performed by an operator, such as a trained operator. The obtained image data for each seed is coupled to the germination estimate as provided by the operator. The image data in combination with the estimate is then stored as reference image data.

Another embodiment for learning patterns from THz images, comprises using supervised machine leaning approach, where feature vectors based on fft (fast fourier transform) or wavelet coefficients are constructed and trained using a machine learning algorithm, e.g. such as SVM (support vector machine). Pattern recognition techniques may be used to automatically or semi-automatically inspect THz images. The pattern recognition techniques comprises several steps. First, a "corpus", i.e. collection of labeled examples (feature vectors) derived from THz images, is constructed. Second, the corpus is randomly split into train and test sets (using e.g. a 90/10 split) where the train set will be used to train the classifier and the test set will be used to evaluate the classifier performance. Mathematically spoken, during the training phase a classifier learns a separation hyperplane in feature space. As a measure of classifier performance a (classical) micro-averaged Recall, Precision and F1-value are estimated. Within these training, testing and evaluating phases the classifier is actually built. Finally, the obtained classifier is used to predict the labels (classes) for unseen examples. As a classification algorithm we use the Support Vector Machine (SVM). SVM is a popular classification algorithm that has been used successfully in various applications. SVM was designed to find a unique, optimal separation hyperplane. A hyperplane is considered optimal when it separates the positive and the negative training examples in such a way that it has the largest possible margin to the nearest training examples as presented. SVM basically solves a special convex Quadratic Programming problem, which is quite computationally demanding, however, an accurate estimation may be achieved.

Figure 2:
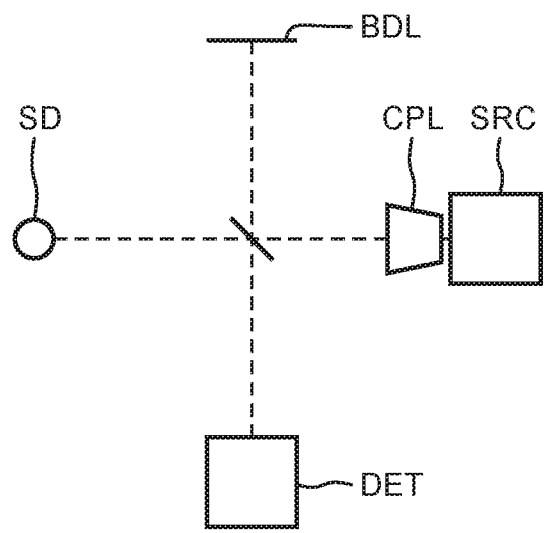
FIG. 2 depicts a schematic view of a terahertz source and detector of the system in accordance with FIG. 1.

In the exemplary example of source and detector, as will be described below with reference to FIGS. 2 and 3, use is made of a vector network analyzer. Vector network analyzers (VNA) are known tools in microwave and millimeter wave laboratories. They are capable of measuring amplitude response and phase response of a circuit under test, for investigating RF properties thereof. As will be explained below, an effective frequency range of the VNA has been extended into the THz range.

A quasi optics measurement scheme is described with reference to FIG. 2. A reflectometer to measure the seed under test is made by using the Michelson interferometer scheme as shown in FIG. 2. A source SRC emits via a horn and a HDP (high density polyethylene) lens (acting as coupling device) the terahertz radiation towards a beam splitter, in this example a 40 microns Mylar positioned at an angle of 45 degrees in respect of a propagation direction of the emitted terahertz signal beam. Main polarization of set-up is vertical and is set by a polarization of detector and transmitter diagonal horns. A ×6 multiplier is used as part of the signal source. The source has an additional WR-8 coupling waveguide port which allows to pick part of the signal before the ×6 multiplier to create a reference for the phase/amplitude detection circuit, as will be explained below with reference to FIG. 3. A sub-harmonically pumped (n=30 . . . 35) superlattice electronic device (SLED) is used for detection. It is mounted into a detector block with integrated diagonal horn. Its SMA type connector DC/IF input was also used to provide a sub harmonic LO signal at 16 . . . 20 GHz. The seed is located in one of the arms of Michelson interferometer there as signal coming to the other arm is absorbed by special load design to absorb THz radiation. The beam as emitted by the source and coupling device travels to the beam splitter, where it is split into a measurement beam travelling to the seed, and parasitic beam which is then absorbed by the beam dump load. A beam dump load BDL absorbs a parasitic signal. Both the reference beam and the measurement beam (as reflected by the seed), reach the beam splitter again, and reflects towards the detector DET. A change in reflectivity changes an amplitude of the beam received by the detector, while a change in reflectivity depth or dielectric properties of the seed changes a phase of the beam received by the detector.

Figure 3:
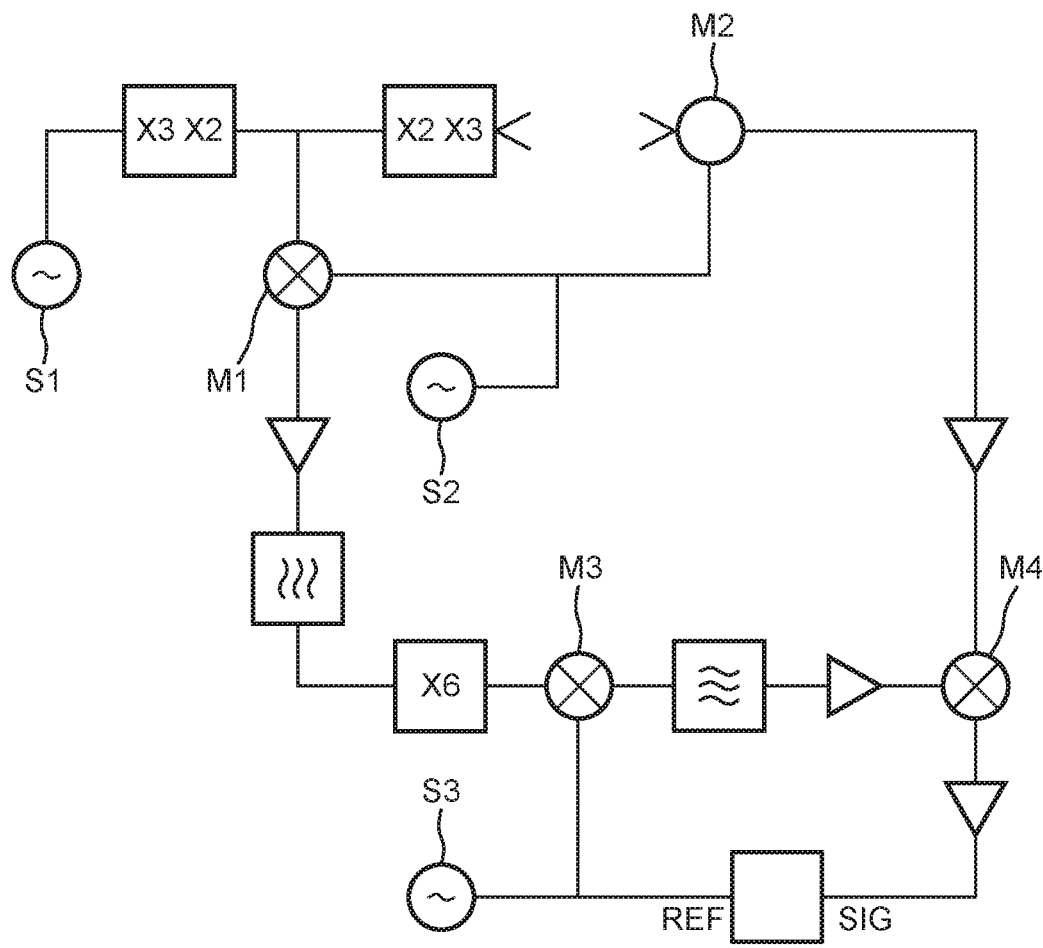
FIG. 3 depicts a schematic top view of a measurement arrangement to illustrate the source and detector as described with reference to FIG. 2.

A block schematic diagram of a source and detection circuit is depicted in FIG. 3. The source is provided with a first frequency synthesizer S1 in a range of 16-18 GHz, which is multiplied by 6, an output signal thereof being provided to mixer M1 as well as to a second multiplier which again multiplies by 6 to generate the source signal. Mixer M1 further received a signal from a second frequency synthesizer S2 which used both for pumping a detector SLED as well as by Schottky mixer M1 for creating a reference system. The primary IF (intermediate frequency) may hence for example be 1 GHz. The IF signal of mixer M1 is amplified and multiplied by 6 to create a primary reference signal. The detected signal is mixed by the signal from synthesizer S2 to 1 Ghz. The primary reference signal is compared with the detected signal taking into account the phase and amplitude information thus providing the detector output signal. From this comparison the information to build the THz image data is obtained. An additional mixer pair M3, M4 was used to take out coherent phase noise introduced by synthesizers S1 and S2 and allow for using extremely narrow detection bandwidth of 100 Hz. A microwave VNA in time sweep mode may be used as signal detection unit. The internal VNA reference oscillator may be used as S3. All S1, S2 and S3 are phase locked to each other. During measurements, for each point of signal frequency the oscillators S1 and S2 have been tuned such that the primary IF stays 1 GHz; output power of S2 is adjusted to maximize S/N at SLED detector and a time sweep of VNA is taken. This procedure is repeated for each frequency, for example following a table lookup procedure in a control computer of the detector.

Figure 4:
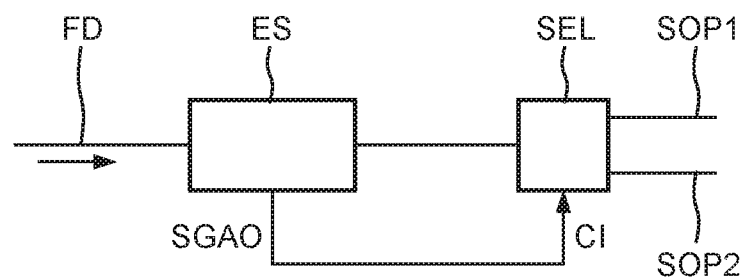
FIG. 4 depicts a block schematic view of a separation system in accordance with an embodiment of the invention.

The image data for a seed is built from the detector output signal in combination with position information derived from the scanning (e.g. position data communicated between the scanner and the data processing device). The estimation is then performed as described above. FIG. 4 depicts a seed selection system in accordance with an embodiment of the invention. A feeding device FD, such as a conveyor or any other feeding device, provides seeds in a sequential way, one by one, to the estimation system ES, such as an estimation system described above with reference to FIGS. 1-3. The estimation system provides a seed germination ability output signal SGAO which provides an estimation of the germination ability of the respective seed. This signal is provided to a control input CI of a selector SEL (comprising e.g. an actuator to direct the seed to a corresponding output of the selector), the selector accordingly directs the seed to one of a plurality of its outputs SOP1, SOP2, so as to separate seeds having different estimates of germination ability accordingly.

The invention may for example be used in agriculture, i.e. to select seeds in accordance with their germination ability, so as to for example remove rotten or otherwise damages seed, to make a selection between healthy seeds having a lower or higher germination ability estimate in order to use them for different agricultural purpose, as well as many other applications.

The invention claimed is:

1. An apparatus for estimating a germination ability of a seed, comprising:
a terahertz signal source for generating a terahertz signal;
a support for holding the seed;
a detector for detecting at least part of the terahertz signal after the terahertz signal has interacted with the seed, wherein the detector detects an amplitude and a phase of the at least part of the terahertz signal that interacted with the seed, the detector including a detector output to output a detector output signal that is representative of the detected amplitude and phase of based on the detected at least part of the terahertz signal;
a data processing device for forming an image data from the detector output signal; and
a decision support system for providing an estimate of the germination ability from the image data.

2. The apparatus according to claim 1, wherein the terahertz signal is in a range of 0.01 to 10 THz.

3. The apparatus according to claim 1, wherein the data processing device combines the amplitude and phase data to form the image data of the seed.

4. The apparatus according to claim 1, wherein the terahertz signal source comprises a microwave signal generator for generating a microwave signal and an up converter, connected to an output of the microwave signal generator, for converting the microwave signal into a terahertz frequency band.

5. The apparatus according to claim 1, wherein the detector comprises a down-converter for converting the detected at least part of the terahertz signal having interacted with the seed into a microwave detection signal.

6. The apparatus according to claim 1, wherein the terahertz signal source and the detector are arranged for free space coupling with the seed.

7. The apparatus according to claim 1, wherein the decision support system:
compares the image data of the seed with at least one reference image data stored by the decision support system; and
derives an estimation of the germination ability of the seed from the comparison of the image data of the seed with the at least one reference image data.

8. The apparatus according to claim 1, further comprising: a scanner for moving the support relative to the terahertz signal to provide a scan of the seed, wherein the data processing device forms the image data from the detector output signal as obtained for a plurality of positions during the scan of the seed.

9. The apparatus according to claim 1, wherein the terahertz signal source provides a synchronization signal to the detector, or vice versa, in order for the detector to operate in synchronism with the terahertz signal source allowing to perform a phase measurement by the detector.

10. The apparatus according to claim 9, wherein the generated terahertz signal is a continuous wave terahertz signal.

11. The apparatus according to claim 1, wherein the image data comprises multiple pixels associated with the respective detector output signals.

* * * * *